May 23, 1967

R. R. WALSH 3,321,691

SELF-REGULATED BATTERY CHARGER

Filed Jan. 10, 1963

INVENTOR
Robert R. Walsh

BY Herbert M Birch

ATTORNEY

United States Patent Office 3,321,691
Patented May 23, 1967

3,321,691
SELF-REGULATED BATTERY CHARGER
Robert R. Walsh, Wilmington, Del., assignor to All American Engineering Company, Wilmington, Del., a corporation of Delaware
Filed Jan. 10, 1963, Ser. No. 250,624
2 Claims. (Cl. 320—40)

This invention relates to battery chargers and more particularly to battery chargers which monitor the terminal voltage of the battery or other load to which they supply energy.

Considering silvercells as specific examples of batteries having a problem of terminal voltage regulation which is readily solved by the present invention, these batteries must be held at or below rated terminal voltage during charging or they will be damaged. Thus, widespread use of such batteries, even though they otherwise have very desirable operating characteristics, has not been possible.

For example, a typical silvercell might require a charging current of 200 milliamperes applied thereto until the terminal voltage of the cell reaches 2.02 volts. Upon reaching this exact terminal voltage the charging current must be immediately discontinued or damage to the cell will result.

Thus, for batteries of this type, charging operations require careful continuous monitoring during the charging cycle and the attendant instrumentation must be of a high sensitivity not commonly found outside of laboratories and other commercial electronic establishments.

It is, therefore, an object of this invention to provide an inexpensive and highly sensitive battery charger including automatic battery terminal voltage monitoring means which automatically terminates the charging cycle of a battery upon the advent of rated terminal voltage at said battery.

Another object of this invention is to provide an inexpensive and highly sensitive battery charger having a first charging circuit including automatic battery terminal voltage monitoring means which automatically terminates the charging operation of said first circuit upon the advent of rated terminal at the battery under charge, and second circuit means comprising means for continuously trickle charging said battery.

Still another object of this invention is to provide an inexpensive and highly sensitive battery charger including automatic battery terminal voltage monitoring means which automatically terminates the charging cycle of a battery upon the advent of rated terminal voltage at said battery, said monitoring means including, as a control element, a silicon controlled semi-conductor switching means.

These and other objects of this invention will become more fully apparent with reference to the following specification and drawings which relates to several preferred embodiments of the invention.

Figure 1:
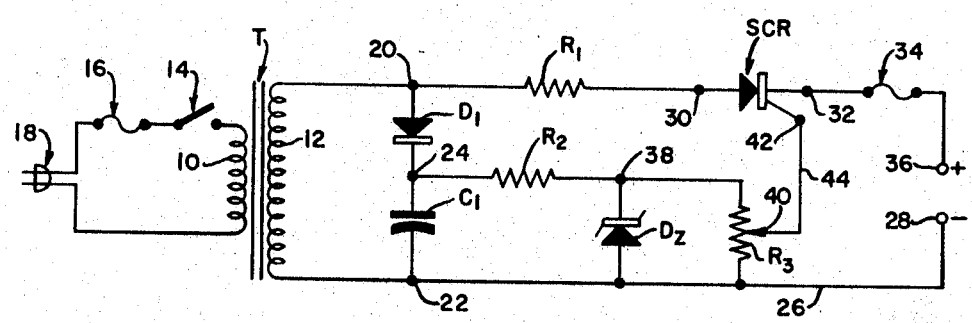
FIGURE 1 is a schematic diagram of a first embodiment of a battery charger under the present invention.

Referring in detail to the drawings and more particularly to FIGURE 1, a first embodiment of the battery charger of the invention is shown as including an input transformer T having a primary winding 10 and a secondary winding 12, the primary 10 being connected in series with an on-off switch 14 and a fuse 16 and adapted to be connected across any suitable alternating current supply by means of a power plug 18.

The secondary 12, of the transformer T, includes first and second output terminals 20 and 22, respectively, across which is connected a rectifier diode $D_1$ in series with a filter capacitor $C_1$, the anode of the diode $D_1$ being connected with the first output terminal 20. The cathode of the diode $D_1$ and one terminal of the filter capacitor $C_1$ are connected at a common node 24.

The second output terminal 22 of the secondary 12 is connected through a common lead 26 directly to the negative output terminal 28 of the battery charger.

The first output terminal 20 of the secondary 12 is connected, via a series circuit comprising a current limiting resistor $R_1$, anode terminal 30 and cathode terminal 32 of a silicon controlled rectifier or three terminal switch SCR and a fuse 34, with the positive output terminal 36 of the battery charger.

A voltage standard is provided by means of a voltage divider comprising first and second series connected dropping resistors $R_2$ and $R_3$, respectively, connected from the node 24 between the rectifier diode $D_1$ and filter capacitor $C_1$ to the common lead 26 and having a common node 38 therebetween which is also connected to the common lead 26 via a Zener diode $D_z$. The Zener diode $D_z$ is thus in parallel with the second dropping resistor $R_3$.

The second dropping resistor $R_3$ is provided with a sliding tap 40 which is connected directly to the gate or control terminal 42 of the silicon controlled rectifier SCR via a lead 44. However, for higher voltage applications wherein large control currents might result, a suitable current limiting resistor may be placed in series with the tap 40 and gate terminal 42.

Figure 2:
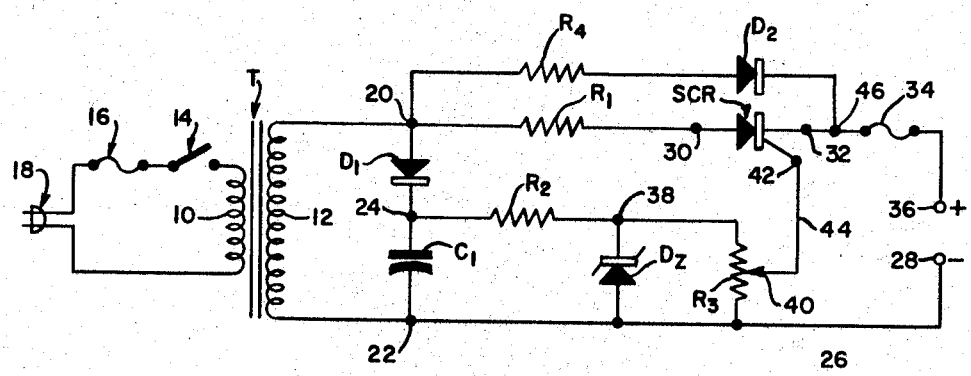
FIGURE 2 is a schematic diagram of a second embodiment of a battery charger under the present invention and comprises the embodiment of FIGURE 1 combined with a trickle charging means.

Referring now to FIGURE 2, a second embodiment of the invention is shown which includes the identical circuit as shown in FIGURE 1, like components being indicated by like numerals, coupled with a trickle charging circuit comprising a series connected current limiting resistor $R_4$ and a rectifying diode $D_2$ connected between the first output terminal 20 of the transformer secondary 12 and a node 46 located between the cathode terminal of the controlled rectifier SCR and the fuse 34.

Operation

Referring to FIGURE 1, the rectifying diode $D_1$ and filter capacitor $C_1$ rectify the output of the transformer secondary 12 and deliver direct current power to the common node 24 therebetween, creating a voltage drop across the voltage divider dropping resistors $R_2$ and $R_3$. The relative values of the said resistors $R_2$ and $R_3$ are such that the Zener diode will break down and conduct in the reverse direction in response to the initial voltage appearing at the node 38 therebetween and across the second dropping resistor $R_3$, whereby thereafter, a regulated standard voltage appears across the said second dropping resistor $R_3$.

By selectively adjusting the position of the slide 40 along the second dropping resistor $R_3$, the gating voltage applied via the lead 44 to the gate terminal 42 of the controlled rectifier SCR is constrained to the proper value with respect to the particular conditions of operation.

A battery, not shown, is connected in charging position across the output terminals 36 and 28 and the gating voltage at the gate terminal 42 is adjusted via the slide 40 such that the minimum forward bias potential from gate terminal 42 to the cathode terminal 32 is equal to the difference between the gating voltage and the maximum rated terminal voltage of the battery being charged, this latter voltage being that appearing at the positive output terminal 36 when the battery is fully charged.

Since it is characteristic of silicon controlled switching devices that they will not conduct except when a small control current determined by a forward bias or gating potential is flowing in a forward direction into the gating terminal thereof, the silicon controlled switching means SCR will be biased to cut off and effectively appear to be an open circuited switch when the potential difference between the gating voltage at the gate terminal 42 and the voltage at the cathode terminal 32, the latter in this case being the terminal voltage of the battery being charged, drops below a predetermined minimum for the particular type silicon controlled switching device used. For example, a silicon controlled switch such as a G. E. Type C5U or a silicon controlled rectifier such as a G. E. Type C15U may be used as the silicon controlled switch means SCR in the present invention.

Referring now to FIGURE 2, wherein the operating of the automatic portion of the circuit shown is identical with that of FIGURE 1, the trickle charging circuit comprising the limiting resistor $R_4$ and the rectifying diode $D_2$ act to continually supply a small trickle of direct current to a battery, not shown, connected across the output terminals 28 and 36 of the charger.

It will be apparent that methods known in the art can be applied for compensating the various components of this circuit against thermal drift of characteristics resulting from changes in ambient temperatures should such additional stability be required.

As can be seen from the foregoing specification and drawings, this invention provides a battery charger which is inexpensive, compact and highly sensitive and which automatically monitors the terminal voltage of a battery being charged thereby and automatically terminates the charge cycle upon the advent of rated or other predetermined terminal voltage at the said battery. There is also provided an embodiment of the invention which additionally provides a trickle charge for that type of batteries connected with the battery charger wherein the trickle charge is needed to prevent chemical deterioration therein. Additionally the present invention provides a battery charging means whereby silvercell batteries and the like may be more widely used commercially.

It is to be understood, that the embodiments of the invention shown and described herein are for the purpose of example only and are not intended to limit the scope of the appended claims.

What is claimed is:

1. Charging means for delivering charging current to a load, said load having a predetermined rated terminal voltage in a fully charged condition and a lesser terminal voltage when in a discharged condition, said charging means comprising a power source, circuit means connected with said power source for deriving a voltage standard therefrom, silicon controlled rectifier means connected in series with said power source and said load, said controlled rectifier means including a gate terminal, and conductor means connecting said gate terminal with said circuit means whereby a bias potential is applied to said gate terminal, said bias potential being selected such that said controlled rectifier means will prevent the flow of charging current to said load upon the advent of rated terminal voltage at said load; wherein said circuit means comprises a filter capacitor and rectifier means connected in series across said power source, a voltage divider comprising first and second series connected resistance means connected across said filter capacitor, and a voltage regulator means connected across said second resistance means, said second resistance means having a variable center tap thereon connected with said conductor means, whereby a selectively variable bias potential is provided for said gate terminal of said controlled rectifier means.

2. Charging means for delivering charging current to a load, said load having a predetermined rated terminal voltage in a fully charged condition and a lesser terminal voltage when in a discharged condition, said charging means comprising a power source, circuit means connected with said power source for deriving a voltage standard therefrom, silicon controlled rectifier means connected in series with said power source and said load, said controlled rectifier means including a gate terminal, and conductor means connecting said gate terminal with said circuit means whereby a bias potential is applied to said gate terminal, said bias potential being selected such that said controlled rectifier means will prevent the flow of charging current to said load upon the advent of rated terminal voltage at said load; wherein said circuit means comprises a filter capacitor and rectifier means connected in series across said power source, a voltage divider comprising first and second series connected resistance means connected across said filter capacitor, and a voltage regulator means connected across said second resistance means, said second resistance means having a variable center tap thereon connected with said conductor means, whereby a selectively variable bias potential is provided for said gate terminal of said controlled rectifier means; and wherein said controlled rectifier means includes anode and cathode terminals in series with said power source and said load, and wherein said bias potential is selected such that the potential difference between said gate terminal and said cathode, when said load is fully charged to rated terminal voltage, is equal to the minimum forward bias required to cause said controlled rectifier means to conduct.

References Cited by the Examiner

UNITED STATES PATENTS

| | | | |
|---|---|---|---|
| 3,018,432 | 1/1962 | Palmer | 323—22 |
| 3,160,805 | 12/1964 | Lawson | 320—39 |
| 3,164,764 | 1/1965 | Marsal et al. | 320—53 |
| 3,176,210 | 3/1965 | Bethke | 320—40 |

JOHN F. COUCH, *Primary Examiner.*

R. C. SIMS, *Examiner.*

L. L. McCOLLUM, G. H. GERSTMAN, S. WEINBERG, *Assistant Examiners.*